United States Patent
Liu et al.

(10) Patent No.: US 9,642,067 B2
(45) Date of Patent: May 2, 2017

(54) METHOD FOR NETWORK OFFLOADING, BASE STATION, AND TERMINAL

(71) Applicant: Huawei Technologies Co., Ltd., Shenzhen, Guangdong (CN)

(72) Inventors: Hai Liu, Shenzhen (CN); Jiangnan Chen, Shenzhen (CN); Xinyou Ma, Shenzhen (CN); Qiming Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 14/526,042

(22) Filed: Oct. 28, 2014

(65) Prior Publication Data

US 2015/0043516 A1    Feb. 12, 2015

Related U.S. Application Data

(63) Continuation of application No. PCT/CN2013/074210, filed on Apr. 15, 2013.

(30) Foreign Application Priority Data

Apr. 28, 2012 (CN) .......................... 2012 1 0133048

(51) Int. Cl.
*H04W 4/02* (2009.01)
*H04W 48/06* (2009.01)
(Continued)

(52) U.S. Cl.
CPC .......... *H04W 48/06* (2013.01); *H04W 48/08* (2013.01); *H04W 84/12* (2013.01)

(58) Field of Classification Search
CPC ...... H04W 48/06; H04W 48/08; H04W 84/12
See application file for complete search history.

(56) References Cited

U.S. PATENT DOCUMENTS

| 7,912,010 B2 * | 3/2011 | Ito ......................... H04W 36/08 370/331 |
| 8,103,285 B2 * | 1/2012 | Kalhan .................. G01S 5/0009 370/328 |

(Continued)

FOREIGN PATENT DOCUMENTS

| CN | 101616167 A | 12/2009 |
| CN | 102006653 A | 4/2011 |

(Continued)

*Primary Examiner* — Ricky Ngo
*Assistant Examiner* — Lan Huong Truong
(74) *Attorney, Agent, or Firm* — Leydig, Voit & Mayer, Ltd (57) ABSTRACT

The present invention provides a network offloading method, a base station, and a terminal, which solves the problem of low user experience of a terminal. Specific steps may include: receiving access point state information of a wireless local area network; and if it is determined, according to stored state information of a network currently accessed by a terminal, that data offloading needs to be performed for the terminal, and it is determined, according to the access point state information, that the terminal is allowed to access the wireless local area network, sending offloading instruction information to the terminal, where the offloading instruction information includes identification information of the wireless local area network, so that the terminal makes the terminal access the wireless local area network according to the identification information of the wireless local area network, and performs data transmission using the wireless local area network.

10 Claims, 8 Drawing Sheets

(51) Int. Cl.
*H04W 48/08* (2009.01)
*H04W 84/12* (2009.01)

(56) References Cited

U.S. PATENT DOCUMENTS

| | | | |
|---|---|---|---|
| 8,751,648 B2 * | 6/2014 | Scherzer | H04L 63/10 709/220 |
| 2002/0080759 A1 * | 6/2002 | Harrington | G01S 5/0215 370/338 |
| 2004/0258028 A1 * | 12/2004 | Hossain | H04L 12/4604 370/335 |
| 2005/0147068 A1 | 7/2005 | Rajkotia | |
| 2007/0115906 A1 | 5/2007 | Gao et al. | |
| 2007/0184845 A1 * | 8/2007 | Troncoso | H04W 64/00 455/456.1 |
| 2011/0222523 A1 | 9/2011 | Fu et al. | |
| 2012/0142278 A1 * | 6/2012 | Wang | H04W 36/0016 455/68 |
| 2012/0190386 A1 * | 7/2012 | Anderson | G01C 15/04 455/456.3 |
| 2012/0230191 A1 * | 9/2012 | Fang | H04W 36/22 370/235 |
| 2013/0196668 A1 | 8/2013 | Bu et al. | |
| 2014/0079007 A1 | 3/2014 | Li et al. | |
| 2014/0086211 A1 | 3/2014 | Liu | |

FOREIGN PATENT DOCUMENTS

| | | |
|---|---|---|
| CN | 102014372 A | 4/2011 |
| CN | 102111819 | 6/2011 |
| CN | 102215530 A | 10/2011 |
| CN | 102318237 A | 1/2012 |
| WO | WO 2004004227 A1 | 1/2004 |
| WO | WO 2010078589 A2 | 7/2010 |
| WO | WO 2011149533 A1 | 12/2011 |
| WO | WO 2011157129 A2 | 12/2011 |

* cited by examiner

METHOD FOR NETWORK OFFLOADING, BASE STATION, AND TERMINAL

CROSS-REFERENCE TO RELATED APPLICATIONS

This application is a continuation of International Patent Application No. PCT/CN2013/074210, filed on Apr. 15, 2013, which claims priority to Chinese Patent Application No. 201210133048.0, filed on Apr. 28, 2012, both of which are incorporated herein by reference in their entireties.

TECHNICAL FIELD

The present invention relates to the field of communication technologies, and in particular, to a method for network offloading, a base station, and a terminal.

BACKGROUND

With rapid development of global data communication, data communication load borne by networks such as 2G/3G (2nd-generation/3rd-generation, 2nd generation mobile communications technology/3rd generation mobile communications technology), LTE (Long Term Evolution, long term evolution) and the like is getting heavier and heavier.

Since a network construction process of WLAN (Wireless Local Area Networks, wireless local area networks) is simple and the cost is low, therefore, part of data on the networks such as the 2G/3G, the LTE and the like can be offloaded to the WLAN network for transmission, so as to decrease the load of the networks such as the 2G/3G, the LTE and the like.

During the implementation of the above network offloading process, after an RNC/BSC (Radio Network Controller/Base Station Controller, radio network controller/base station controller) performs data offloading for a terminal, a better QoS (Quality of Service, quality of service) service cannot be provided when the terminal performs data transmission using the WLAN, a user experience of the terminal is degraded.

SUMMARY

The present invention provides a method for network offloading, a base station and a terminal, and solves the problem of degrading the user experience of a terminal.

To achieve the above goal, the present invention adopts following technical solutions:

In one aspect, there is provided a method for network offloading including:

receiving access point state information of a wireless local area network, where the access point state information includes at least one item of information on a ratio at which an access point is allowed to be used, load information of the access point, or interference information of the access point;

sending offloading instruction information to the terminal, if it is determined, according to stored state information of a network currently accessed by a terminal, that data offloading needs to be performed for the terminal, and it is determined, according to at least one item of the information on the ratio at which the access point is allowed to be used, the load information of the access point, or the interference information of the access point included in the access point state information, that the terminal is allowed to access the wireless local area network, where the offloading instruction information includes identification information of the wireless local area network, so that the terminal makes the terminal access the wireless local area network according to the identification information of the wireless local area network and performs data transmission using the wireless local area network.

In another aspect, there is provided another method for network offloading including:

receiving offloading instruction information, where the offloading instruction information includes identification information of a wireless local area network, the offloading instruction information is sent to a terminal after a base station determines that the terminal is allowed to access the wireless local area network according to received access point state information, and the access point state information includes at least one item of information on a ratio at which an access point is allowed to be used, load information of the access point, or interference information of the access point;

making the terminal access the wireless local area network according to the identification information of the wireless local area network, and performing data communication using the wireless local area network.

In another aspect, there is provided a base station including:

a receiver, configured to receive access point state information of a wireless local area network, where the access point state information includes at least one item of information on a ratio at which an access point is allowed to be used, load information of the access point, or interference information of the access point;

a transmitter, configured to send offloading instruction information to a terminal, if it is determined, according to stored state information of a network currently accessed by the terminal, that data offloading needs to be performed for the terminal, and it is determined, according to at least one item of the information on the ratio at which the access point is allowed to be used, the load information of the access point, or the interference information of the access point included in the access point state information received by the receiver, that the terminal is allowed to access the wireless local area network, where the offloading instruction information includes identification information of the wireless local area network, so that the terminal makes the terminal access the wireless local area network according to the identification information of the wireless local area network and performs data transmission using the wireless local area network.

In another aspect, there is provided a terminal including:

a receiver, configured to receive offloading instruction information, where the offloading instruction information includes identification information of a wireless local area network, the offloading instruction information is sent to the terminal after a base station determines that the terminal is allowed to access the wireless local area network according to received access point state information, the access point state information includes at least one item of information on a ratio at which an access point is allowed to be used, load information of the access point, or interference information of the access point;

a processor, configured to make the terminal access the wireless local area network according to the identification information of the wireless local area network received by the receiver, and perform data communication using the wireless local area network.

In existing solutions, whether data offloading needs to be performed for a terminal is determined only based on load information or interference information of the currently used network, the determining result is not accurate, causing that the traffic to be transmitted cannot get a better Qos service, thereby degrading the user experience of the terminal. However, in the method for network offloading, the base station, and the terminal provided by embodiments of the present invention, whether the terminal is allowed to access a wireless local area network is determined according to acquired access point state information of the wireless local area network, so that when determining whether the terminal performs offloading by accessing the wireless local area network, the base station not only takes account of the state information of the network currently used by the terminal, but also considers the access point state information of the wireless local area network, the accuracy of the determining result is increased, a better Qos service can be provided for the traffic to be transmitted after the terminal accesses the wireless local area network, and the user experience of the terminal is improved.

BRIEF DESCRIPTION OF DRAWINGS

To describe technical solutions in embodiments of the present invention more clearly, the following briefly introduces accompanying drawings needed for describing the embodiments. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

Technical solutions of the present invention are hereinafter described in detail with reference to the accompanying drawings. It is evident that the embodiments described are only part of embodiments of the present invention rather than all embodiments. Other embodiments that those skilled in the art obtain based on the embodiments of the present invention also fall within the protection scope of the present invention.

To describe the following embodiments clearer, the method for network offloading in the prior art is described briefly at first.

The specific offloading process may include:

1. A terminal activates PDP (Packet Data Protocol, packet data protocol) context, and acquires an IP (Internet Protocol, internet protocol) address of the terminal;

2. The terminal sends an initial data packet to an RNC/BSC, the initial data packet may include but is not limited to: information of an IP address, a destination address, port information etc., where the destination address may be a network address that the terminal uses when performing data transmission;

3. The RNC/BSC determines whether a received destination address is the same as a preset network address, if the destination address is the same as the preset network address, then determine whether a load of a network corresponding to the destination address exceeds a preset value, if the preset value is exceeded, send an offloading instruction to the terminal according to the information of the IP address and the port of the terminal, where the offloading instruction may include SSID (Service Set Identifier, service set identifier <WLAN network identifier>).

4. The terminal accesses a corresponding WLAN according to the SSID, and uses the WLAN to perform data transmission.

Figure 1:
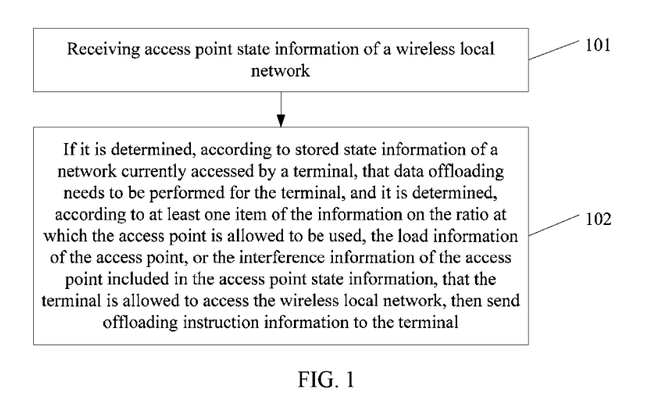
FIG. 1 is a flowchart of a method for network offloading according to an embodiment.

To solve the problem in the prior art that the terminal cannot get a better Qos service after accessing the WLAN and the user experience of the terminal is degraded, an embodiment provides a method for network offloading, the executive entity of which is a base station, and as shown in FIG. 1, following steps can be included:

101: Receive access point state information of a WLAN.

To decrease interference or a load of a network currently used by a terminal, a base station offloads part of data to be transmitted of the terminal to the WLAN for transmission.

Therefore, in order to prepare for subsequent steps, the base station receives the access point state information of the WLAN. The access point state information may include at least one item of information on a ratio at which an access point is allowed to be used, load information of the access point, or interference information of the access point.

102. If it is determined, according to stored state information of a network currently accessed by a terminal, that data offloading needs to be performed for the terminal, and it is determined, according to at least one item of the information on the ratio at which the access point is allowed to be used, the load information of the access point, or the interference information of the access point included in the access point state information, that the terminal is allowed to access the WLAN, then send offloading instruction information to the terminal, where the offloading instruction information includes identification information of the WLAN, so that the terminal makes the terminal access the WLAN according to the identification information of the WLAN, and the terminal is enabled to perform data transmission using the WLAN.

Specifically, the base station stores the state information of the network currently accessed by the terminal, and determines whether offloading needs to be performed for the terminal according to the stored state information of the network, if the offloading needs to be performed for the terminal, then determine whether the terminal is allowed to access the WLAN according to at least one item of the information on the ratio at which an access point is allowed to be used, the load information of the access point, or the interference information of the access point included in the access point state information, if the terminal is allowed to access the WLAN, then send the offloading instruction information to the terminal.

Where, the offloading instruction information may include the identification information of the WLAN; the terminal makes the terminal access the WLAN according to the identification information of the WLAN included in the offloading instruction information after receiving the offloading instruction information, which enables the terminal to perform data transmission using the WLAN, so as to ensure the reduction of the interference or the load of the network currently used by the terminal.

After adopting the above solution, whether the terminal is allowed to access the wireless local area network is determined according to the acquired access point state information of the wireless local area network, which enable the base station to take into consideration not only the state information of the network currently used by the terminal, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

Figure 2:
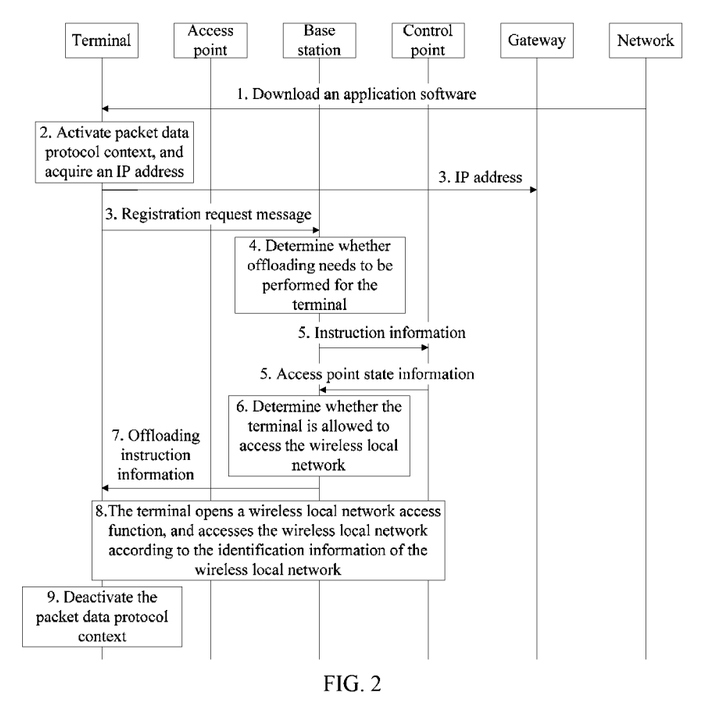
FIG. 2 is a schematic flowchart of steps of the method for network offloading according to FIG. 1.

As an improvement, the embodiment provides another method for network offloading. FIG. 2 is a schematic flowchart of executing steps of the method for network offloading provided by this embodiment.

The specific process shown in FIG. 2 may include:

1. A terminal downloads and installs an application software, where the application software is configured to instruct the terminal to execute a corresponding operation.

2. To acquire a local IP address, the terminal activates packet data protocol context.

3. The terminal sends registration request information to a base station, where the registration request information may include but is not limited to: an IP address of the terminal, identification information of a network currently accessed by the terminal, etc.; the terminal may also send the IP address of the terminal to a gateway etc.

4. The base station acquires and stores state information of the network currently accessed by the terminal according to the identification information of the network, determines whether offloading needs to be performed for the terminal; if offloading needs to be performed for the terminal, execute step 5, if offloading needs not to be performed for the terminal, the process is terminated;

5. The base station sends instruction information to a control point configured to control an access point and receives access point state information, where the instruction information is used to instruct the control point to send the access point state information of a WLAN to the base station, and the control point may be but is not limited to a wireless controller.

6. The base station determines whether the terminal is allowed to access the WLAN according to the access point state information; if the terminal is allowed to access the WLAN, execute step 7, if the terminal is not allowed to access the WLAN, the process is terminated.

7. The base station sends offloading instruction information to the terminal according to the IP address, where the offloading instruction information includes identification information of the WLAN.

8. The terminal turns on a WLAN access function, and accesses the WLAN according to the identification information of the WLAN.

9. The terminal deactivates the packet data context after accessing the WLAN successfully, after then, data transmission on the terminal is all performed by using the WLAN.

After adopting the above solution, whether the terminal is allowed to access the wireless local area network is determined according to the acquired access point state information of the wireless local area network, which enables the base station to take into consideration not only the state information of the network currently used by the terminal, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

Figure 3:
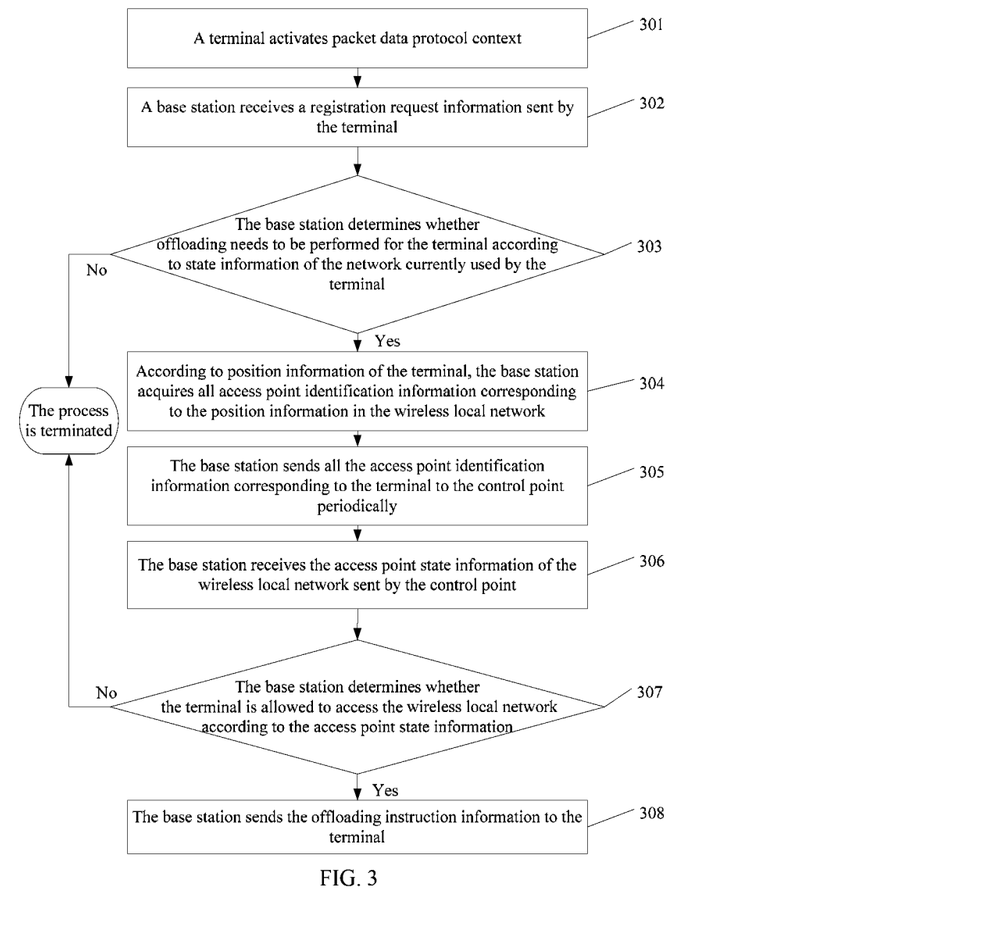
FIG. 3 is a flowchart of another method for network offloading according to an embodiment.

Another method for network offloading of the present invention, as shown in FIG. 3, includes:

301. A terminal activates PDP context.

In the process of activating the PDP context, the terminal may acquire an IP address allocated by a mobile network GGSN (Gateway GPRS Support Node, gateway GPRS (General Packet Radio Service, general packet radio service) support node), and the terminal uses this IP (Internet Protocol, internet protocol) address to access a internet service.

This embodiment does not restrict the method of activating the PDP context, which is a familiar technique among peoples skilled in the art. The details will not be described herein.

302. The base station receives registration request information sent by the terminal, where the registration request information may include but is not limited to: an IP address of the terminal, identification information of a network currently accessed by the terminal, etc.

For the base station to acquire the IP address of the terminal, the identification information of the network currently accessed by the terminal, etc. and instruct the terminal to perform a corresponding operation such as offloading operation etc. according to the information acquired by the terminal, the terminal sends the registration request message to the base station, the base station gets the IP address and the port of the terminal after receiving the registration request information, and subsequently the base station sends offloading instruction information to the IP address and the port.

As one implementation mode of the embodiment, an application software can be installed on the terminal to send the registration request information to the base station and receive the offloading instruction information sent by the base station. The application software can send a UDP (User Datagram Protocol, user datagram protocol) packet, a source address is the IP address acquired by PDP activation, a source port is allocated by the terminal randomly, a destination address can be a preset IP address such as 192.168.254.254, a destination port may also use a preset port such as 9999 etc. The base station processing the registration request of the terminal can include that: after receiving the registration request information sent by the terminal, the base station determines whether the destination address and the destination port are a special agreed address and port, if yes, the base station allows the terminal to register.

This embodiment does not restrict the method of sending the registration request information by the terminal and processing the registration request by the base station, which can be set according to an actual requirement. The details will not be described herein.

303. The base station determines whether offloading needs to be performed for the terminal according to the state information of the network currently used by the terminal, if the base station determines that the offloading needs to be performed for the terminal, then execute step 304; if the offloading needs not to be performed for the terminal, the process is terminated.

As one implementation mode of the embodiment, if the state information of the network includes load information, the load of the cellular network currently used is greater than a certain threshold, and there is a WLAN network at the terminal's current position, then it can be preliminarily determined that the offloading needs to be performed for the terminal.

This embodiment does not restrict the content included in the state information of the network currently used by the terminal, which may be set according to an actual requirement, for example, the state information of the network can include: load information and/or interference information etc. The details will not be described herein.

304. The base station acquires all access point identification information corresponding to the position information in the WLAN according to the position information of the terminal.

The WLAN can include at least one AP (Access Point, access point), and an AC (AP Controller, APAC) etc., the AC is configured to control the access point and can store the access point identification information, the access point state information, etc., the access point state information can be used to describe whether the access point is allowed to be used.

When the terminal locates at a different cell, the access point that is allowed to be used in the WLAN may differ. Thereby, the base station determines the cell position where the terminal locates according to the position information of the terminal, and then determines all the access point identification information corresponding to the terminal in the WLAN according to the cell position. That is to say, before the terminal accesses the WLAN, the base station acquires the access point that is allowed to be used by the terminal according to the position information of the terminal.

Where, the position information can be included in the registration request information; or, the base station acquires the position information of the terminal according to the IP address in the registration request information.

This embodiment does not restrict the method of acquiring the position information, which may be set according to an actual requirement. The details will not be described herein.

This embodiment does not restrict the method of acquiring the access point identification information of the WLAN according to the position information of the terminal, which may be set according to an actual requirement, for example: configuring may be performed on the base station to configure the correspondence between the corresponding cellular network cell and WLAN network SSID. The details will not be described herein.

305. The base station sends all the access point identification information corresponding to the terminal to the control point periodically.

All the access point identification information corresponding to the terminal can be: all the access point identification information that is allowed to be used by the terminal.

Where, the control point may be an AC, the access point identification information is used to instruct the AC to send the access point state information corresponding to the access point identification information to the base station which the terminal belongs to.

That is to say, the base station acquires all the access point state information that the terminal is allowed to use through sending the AC all the access point identification information that the terminal is allowed to use.

The base station can adopt TCP (Transmission Control Protocol, transmission control protocol), or UDP, or SCTP (Stream Control Transmission Protocol, stream control transmission protocol) and so on to send the AC all the access point identification information corresponding to the terminal.

This embodiment does not restrict the method of sending the access point identification information to the AC by the base station, which may be any methods that are familiar to peoples skilled in the art. The details will not be described herein.

306. The base station receives the access point state information of the WLAN sent by the control point.

After periodically sending the AC all the access point identification information corresponding to the terminal, the base station receives the access point state information of the WLAN sent by the AC. The access point state information can include at least one item of information on a ratio at which an access point is allowed to be used, load information of the access point, or interference information of the access point.

In this embodiment, since the base station sends all the access point state information corresponding to the terminal actively and periodically, thereby, the base station can receive corresponding access point state information periodically. The method for receiving the access point state information of the WLAN sent by the AC, provided in this embodiment, is to acquire the access point state information by the base station actively and periodically.

307. The base station determines whether the terminal is allowed to access the WLAN according to the access point state information of the WLAN, if the terminal is allowed to access the WLAN, then execute step 308; if the terminal is not allowed to access the WLAN, then the process is terminated.

To decrease the interference, or the load of the network currently used by the terminal, the terminal offloads part of data to the WLAN for transmission.

If data offloading needs to be performed for the terminal, then before the offloading for the terminal, the base station determines whether the terminal is allowed to access the WLAN first.

As one implementation mode of the embodiment, the base station can determine whether the terminal is allowed to access the WLAN according to whether service information of the terminal is supported by the WLAN; if the WLAN supports the service of the terminal, the WLAN allows the terminal to access the WLAN; if the WLAN does not support the service of the terminal, the WLAN does not allow the terminal to access the WLAN.

Or, the base station determines whether the terminal is allowed to access the WLAN according to the current network state of the WLAN, for example: the load information of the WLAN, the interference information of the WLAN and so on, if the load of the WLAN is greater than a preset load value, the WLAN does not allow the terminal to access the WLAN; if the load of the WLAN is not greater than the preset load value, the WLAN allows the terminal to access the WLAN.

Or, combining the above two determining methods to perform determining.

This embodiment does not restrict the method of determining whether the terminal is allowed to access the WLAN, which may be set according to an actual requirement. The details will not be described herein.

308. The base station sends offloading instruction information to the terminal, so that the terminal makes the terminal access the WLAN according to the identification information of the WLAN after receiving the offloading instruction, and performs data transmission using the WLAN.

The base station sends the offloading instruction information to the terminal, the offloading instruction information can include identification information of the WLAN, for example, SSID etc., so that the terminal accesses the WLAN according to the identification information of the WLAN and performs data transmission using the WLAN, so as to ensure the reduction of the interference or the load of the network currently used by the terminal.

This embodiment does not restrict the method of accessing the WLAN by the terminal, which is a familiar technique among people skilled in the art. The details will not be described herein.

As one implementation mode of the embodiment, the terminal can send change information to a user after receiving the offloading instruction information, the change information is used to notify the user that the network has been changed; and the terminal can turn on WLAN automatically, and after accessing the WLAN successfully and deactivating the PDP context, the terminal will perform data transmission using the WLAN.

This embodiment does not restrict the method of deactivating the PDP context, which is a familiar technique among people skilled in the art. The details will not be described herein.

Further, optionally, the offloading instruction information can be send by RRC (Radio Resource Control, radio resource control) signaling.

The RRC is used to process the information of the control plane between the terminal and a UTRAN (Terrestrial Radio Access Network, terrestrial radio access network).

Figure 4:
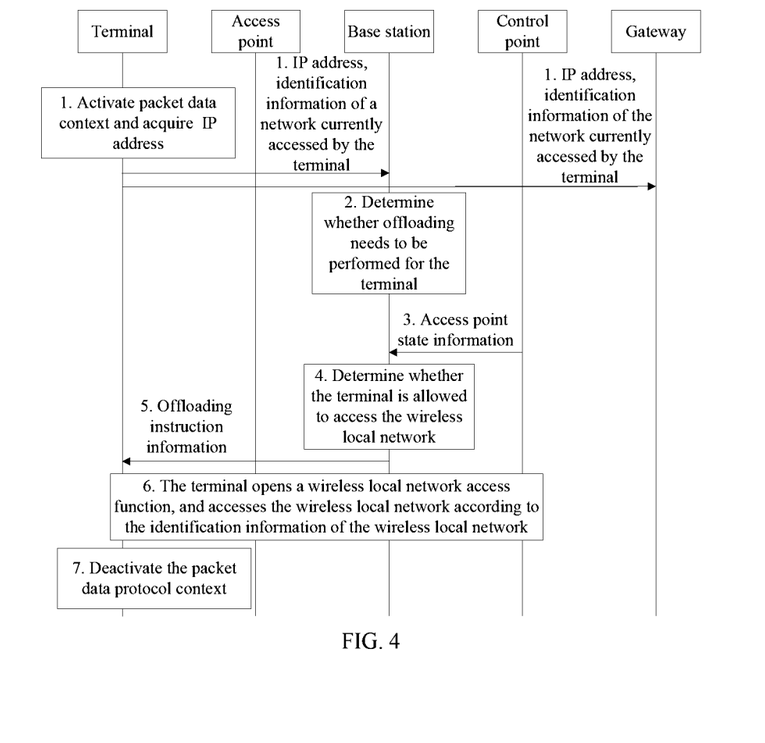
FIG. 4 is a schematic flowchart of steps of a method for network offloading when offloading instruction information adopts RRC signaling for transmission according to an embodiment.

FIG. 4 is a schematic flowchart of steps of a method for network offloading when offloading instruction information is sent using RRC signaling, which includes:

1. To acquire a local IP address, a terminal activates packet data protocol context and sends the base station an IP address of the terminal, identification information of a network currently accessed by the terminal, etc.;

2. The base station acquires and stores state information of the network currently accessed by the terminal according to the identification information of the network, determines whether offloading needs to be performed for the terminal; if offloading needs to be performed for the terminal, then execute step 3, if offloading needs not to be performed for the terminal, then the process is terminated;

3. The base station receives access point state information of a WLAN sent actively by an AC;

4. Determine whether the terminal is allowed to access the WLAN according to the access point state information; if being allowed to access the WLAN, then execute step 5, if not being allowed to access the WLAN, then the process is terminated;

5. The base station sends offloading instruction information to the terminal according to the IP address, where the offloading instruction information includes identification information of the WLAN;

6. The terminal turns on a WLAN access function and accesses the WLAN according to the identification information of the WLAN;

7. After accessing the WLAN successfully, the terminal deactivates the packet data context, after then, all the data transmission on the terminal is performed using the WLAN.

After adopting the above solution, whether the terminal is allowed to access the wireless local area network is determined according to the acquired access point state information of the wireless local area network, to enable the base station to take into consideration not only the state information of the network currently used by the terminal, but also the access point state information of the wireless local area network when determining whether the terminal performs offloading by accessing the wireless local area network, the accuracy of the determining result is increased, the terminal is enabled to provided a better Qos service to the traffic to be transmitted after accessing the wireless local area network, and the user experience of the terminal is improved.

Figure 5:
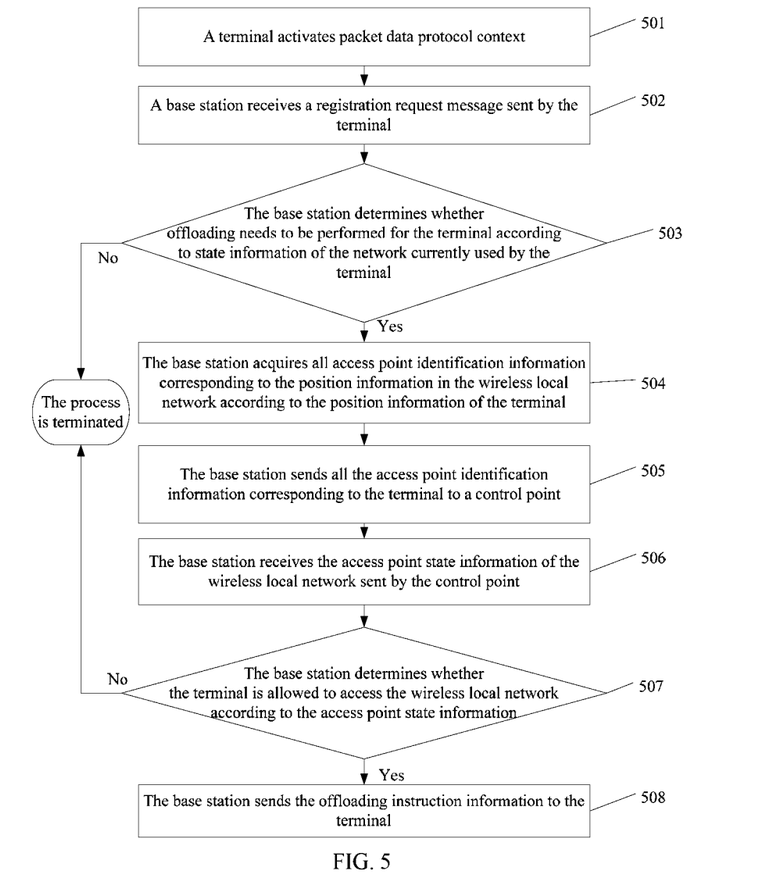
FIG. 5 is a flowchart of a method for network offloading according to an embodiment, where access point state information is actively acquired.

The embodiment as shown in FIG. 5 is another method for network offloading, in this method, the executive entity is a base station, and the base station receives access point state information actively, steps 501 to 504 in this embodiment are similar to steps 301 to 304 of the embodiment shown in FIG. 3, steps 506 to 508 in this embodiment are similar to steps 306 to 308 of the embodiment shown in FIG. 3, the differences lie in that:

505. The base station sends all the access point identification information corresponding to the terminal to the AC.

All the access point identification information corresponding to the terminal is used to instruct the AC to send all the access point state information corresponding to the terminal to the base station, or, all the access point identification information corresponding to the terminal is used to instruct the AC to send all the access point state information in the WLAN to the base station.

In this embodiment, instead of sending periodically, the base station sends all the access point identification information corresponding to the terminal to the AC only after it is determined in step 503 that data offloading needs to be performed for the terminal.

In this embodiment, in step 506, the base station sends the access point identification information to the AC only when determining that offloading needs to be performed for the terminal, and thereby, the base station can receive the access point state information only when determining that offloading needs to be performed for the terminal. In this method, the base station acquires the access point state information actively when the data offloading needs to be performed for the terminal.

After adopting the above solution, whether the terminal is allowed to access the wireless local area network is determined according to the acquired access point state information of the wireless local area network, to enable the base station to take into consideration not only the state information of the network currently used by the terminal, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

Figure 6:
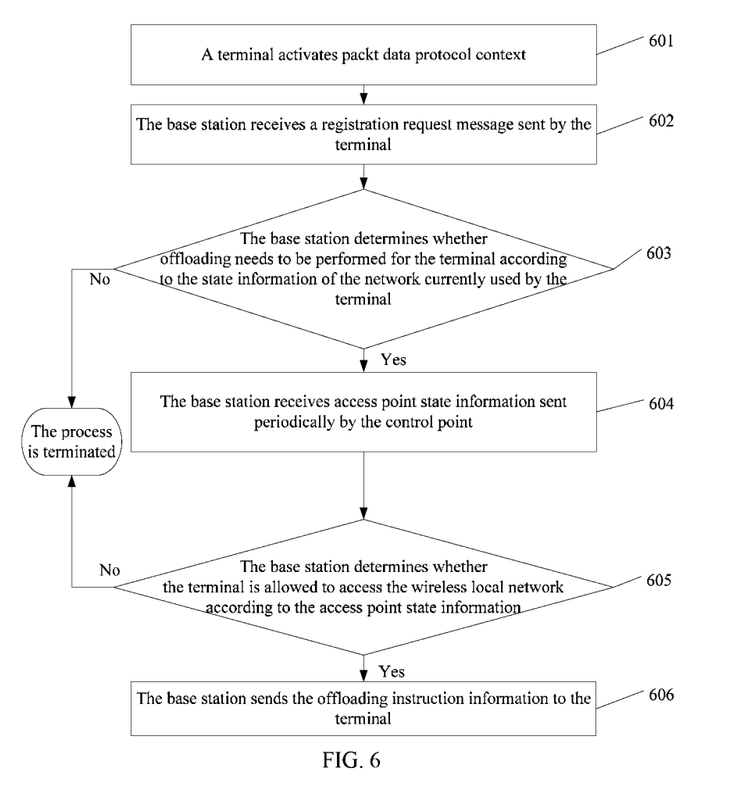
FIG. 6 is a flowchart of a method for network offloading according to an embodiment, where access point state information is passively received.

The embodiment as shown in FIG. 6 is another method for network offloading. In this method, the executive entity is a base station, steps 601 to 603 in this embodiment are similar to steps 301 to 303 of the embodiment shown in FIG. 3, steps 605 to 606 in this embodiment are similar to steps 307 to 308 of the embodiment shown in FIG. 3, the differences lie in that:

604. The base station receives the access point state information sent periodically by the control point.

The AC sends the access point state information to the base station periodically, so that the access point state information that the base station acquires reflects the current state more accurately.

In this method, the AC actively sends the access point state information to the base station, namely, the base station receives the access point state information passively.

This step is executed after it is determined in step 603 that offloading needs to be performed for the terminal, if offloading needs not to be performed for the terminal, the process is terminated.

After adopting the above solution, whether the terminal is allowed to access the wireless local area network is determined according to the acquired access point state information of the wireless local area network, to enable the base station to take into consideration not only the state information of the network currently used by the terminal into account, but also the access point state information of the wireless local area network when determining whether the terminal performs offloading by accessing the wireless local area network, the accuracy of the determining result is increased, the terminal is enabled to provided a better Qos service for the traffic to be transmitted after accessing the wireless local area network, and the user experience of the terminal is improved.

Figure 7:
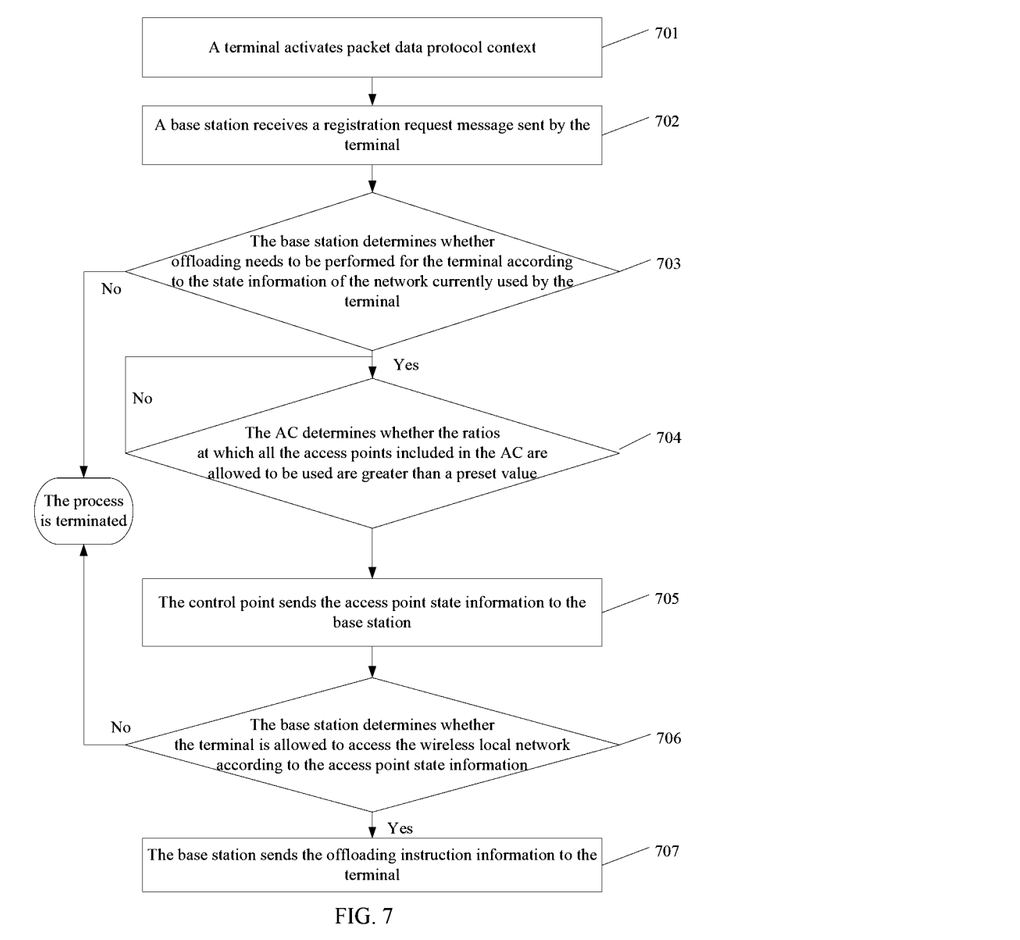
FIG. 7 is a flowchart of another method for network offloading according to an embodiment, where access point state information is passively received.

The embodiment as shown in FIG. 7 is another method for network offloading. In this method, the executive entity is a base station, and the base station receives the access point state information actively, steps 701 to 703 in this embodiment are similar to steps 301 to 303 of the embodiment shown in FIG. 3, steps 706 to 707 in this embodiment are similar to steps 307 to 308 of the embodiment shown in FIG. 3, the differences lie in that:

704. The AC determines whether ratios at which all the access points included in the AC are allowed to be used are greater than a preset value.

If the ratios at which all the access points included in the AC are allowed to be used are greater than the preset value, then execute step 705; if the ratios at which all the access points included in the AC are allowed to be used are not greater than the preset value, then execute step 704 continually.

This step is executed after it is determined in step 703 that offloading needs to be performed for the terminal, if offloading needs not to be performed for the terminal, the process is terminated.

705. The AC sends the access point state information to the base station.

The access point state information is sent to the base station when the control point determines that the ratios at which all the access points included in the control point are allowed to be used are greater than the preset value.

As one implementation mode of the embodiment, the AC determines the ratios at which all the included access points are allowed to be used, if the ratios are greater than a preset ratio, then the AC sends the access point state information to the base station; if the ratios are not greater than a preset ratio, the AC does not send the access point state information to the base station.

Where, the preset ratio can be: 20% or 30% or 40% etc.

Furthermore, optionally, the AC can also send the access point state information to the base station according to a preset time, namely, the AC sends the access point state information to the terminal only when the preset time is satisfied.

In this method, the AC actively sends the access point state information to the base station, namely, the base station receives the access point state information passively.

This embodiment does not impose a restriction on the value of the preset ratio, the value of the preset time, and the method of sending the access point state information to the base station by the AC, which may be set according to an actual requirement. The details will not be described herein.

After adopting the above solution, whether the terminal is allowed to access the wireless local area network is determined according to the acquired access point state information of the wireless local area network, to enable the base station takes into consideration not only the state information of the network currently used by the terminal, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

The four methods of receiving the access point state information of the WLAN provided in the above four embodiments are common methods, the embodiments do not restrict the method of receiving the access point state information of the WLAN, which may be set according to an actual requirement. The details will not be described herein.

Figure 8:
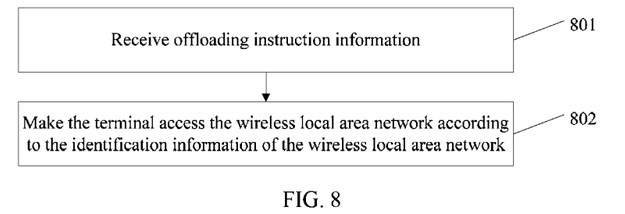
FIG. 8 is a flowchart of a method for network offloading according to an embodiment, with a terminal as an executive entity.

This embodiment provides another method for network offloading, the executive entity of this method is a terminal, as shown in FIG. 8, the specific steps can include:

801. Receive offloading instruction information, where the offloading instruction information includes identification information of a wireless local area network, the offloading instruction information is sent to a terminal after a base station determines that the terminal is allowed to access the wireless local area network according to received access point state information, and the access point state information includes at least one item of information on a ratio at which an access point is allowed to be used, load information of the access point, or interference information of the access point.

802. Make the terminal access the wireless local area network according to the identification information of the wireless local area network, and perform data communication using the wireless local area network.

After adopting the above solution, the terminal accesses the WLAN according to the offloading instruction information sent by the base station, the offloading instruction information is sent to the terminal after the base station determines that the terminal is allowed to access the WLAN according to the received access point state information, which enables the base station to take into consideration not only the state information of the network currently used by the terminal into account, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

Figure 9:
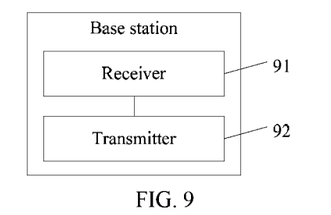
FIG. 9 is a schematic structural diagram of a base station according to an embodiment.

This embodiment provides a base station, as shown in FIG. 9, including: a receiver 91, and a transmitter 92.

Where, the receiver 91 is configured to receive access point state information of a WLAN, where the access point state information includes at least one item of information on a ratio at which an access point is allowed to be used, load information of the access point, or interference information of the access point.

The transmitter 92 is configured to send offloading instruction information to the terminal, if it is determined, according to stored state information of a network currently accessed by a terminal, that data offloading needs to be performed for the terminal and it is determined, according to at least one item of the information on the ratio at which the access point is allowed to be used, the load information of the access point, or the interference information of the access point included in the access point state information, that the terminal is allowed to access the WLAN, where the offloading instruction information includes identification information of the WLAN, so that the terminal makes the terminal access the WLAN according to the identification information of the WLAN and performs data transmission using the WLAN.

After adopting the above solution, whether the terminal is allowed to access the wireless local area network is determined according to the access point state information of the wireless local area network received by the receiver, to enable the base station to take into account not only the state information of the network currently used by the terminal, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

Figure 10:
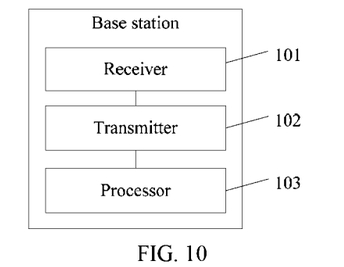
FIG. 10 is a schematic structural diagram of another base station according to an embodiment.

As an improvement to the embodiment, this embodiment provides another base station, as shown in FIG. 10, including: a receiver 101, a transmitter 102, and an processor 103.

Where, the receiver 101 is configured to receive access point state information of a WLAN, the access point state information includes at least one item of information on a ratio at which an access point is allowed to be used, load information of the access point, or interference information of the access point.

Further, optionally, the receiver 101 is specifically configured to receive the access point state information of the wireless local area network sent by a control point, where the control point is configured to control the access point of the wireless local area network.

Specifically, the receiver 101 is specifically configured to receive the access point state information of the wireless local area network sent periodically by a control point.

Or, the receiver 101 is specifically configured to receive the access point state information sent by the control point when the control point determines that the ratios at which all the access points included in the control point are allowed to be used are greater than a preset value.

This embodiment does not restrict the method of receiving the access point state information by the receiver, which may be set according to an actual requirement and will not be detailed herein.

The transmitter 102 is configured to send offloading instruction information to the terminal if it is determined, according to stored state information of a network currently accessed by a terminal, that data offloading needs to be performed for the terminal and it is determined, according to at least one item of the information on the ratio at which the access point is allowed to be used, the load information of the access point, or the interference information of the access point included in the access point state information, that the terminal is allowed to access the WLAN, where the offloading instruction information includes identification information of the WLAN, so that the terminal makes the terminal access the WLAN according to the identification information of the WLAN and performs data transmission by using the WLAN.

The processor 103 is configured to acquire, according to position information of the terminal, all access point identification information corresponding to the position information in the wireless local area network.

Further, the transmitter 102 is further configured to periodically send the access point identification information to a control point, where the access point identification information is used to instruct the control point to send all the access point state information corresponding to the access point identification information to the base station, and the control point is configured to control the access point of the wireless local area network.

Further, the control point may be but is not limited to a wireless local area network control point WLAN AC; the access point may be but is not limited to a wireless local area network access point WLAN AP.

After adopting the above solution, whether the terminal is allowed to access the wireless local area network is determined according to the access point state information of the wireless local area network acquired by the processor, to enable the base station takes into account not only the state information of the network currently used by the terminal, but also the access point state information of the wireless local area network when determining whether the terminal performs offloading by accessing the wireless local area network, the accuracy of the determining result is increased, the terminal is enabled to provide a better Qos service for the traffic to be transmitted after accessing the wireless local area network, and the user experience of the terminal is improved.

Figure 11:
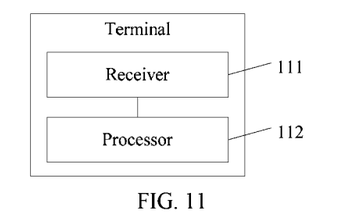
FIG. 11 is a schematic structural diagram of a terminal according to an embodiment.

As shown in FIG. 11, this embodiment provides a terminal including: a receiver 111 and an processor 112.

Where, the receiver 111 is configured to receive offloading instruction information, where the offloading instruction information includes identification information of a wireless local area network, the offloading instruction information is sent to the terminal after a base station determines that the terminal is allowed to access the wireless local area network according to received access point state information, the access point state information includes at least one item of information on a ratio at which an access point is allowed to be used, load information of the access point, or interference information of the access point;

The processor 112 is configured to make the terminal access the wireless local area network according to the identification information of the wireless local area network received by the receiver, and perform data communication using the wireless local area network.

After adopting the above solution, the terminal accesses the WLAN according to the offloading instruction information sent by the base station, the offloading instruction information is sent to the terminal after the base station determines that the terminal is allowed to access the WLAN according to the received access point state information, the base station is enabled to take into account not only the state information of the network currently used by the terminal, but also the access point state information of the wireless local area network when determining whether the terminal performs offloading by accessing the wireless local area network, the accuracy of the determining result is increased, the terminal is enabled to provide a better Qos service to the traffic to be transmitted after accessing the wireless local area network, and the user experience of the terminal is improved.

Through the above descriptions of the embodiments, it is clear to persons skilled in the art that the present invention may be implemented by software plus necessary universal hardware, and definitely may also be implemented by hardware, however in many cases, the former implementation mode is preferred. According to such understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, a network device, and the like) to execute the methods described in the embodiments of the present invention.

The above descriptions are merely specific embodiments of the present invention, but, are not intended to limit the protection scope of the present invention. Any variation or replacement that may be easily figured out by persons skilled in the art within the technical scope disclosed in the present invention shall fall within the protection scope of the present invention. Therefore, the protection scope of the present invention shall be subject to the protection scope of the claims.

What is claimed is:

1. A method for network offloading, comprising:
   receiving, by a network device, access point state information of a wireless local area network from a control point based on the control point determining that ratios at which all access points corresponding to the control point are allowed to be used are greater than a preset value, wherein the access point state information comprises information regarding a ratio at which an access point is allowed to be used, load information of the access point, and/or interference information of the access point;
   determining, by the network device, that data offloading is to be performed for a terminal connected to a network based on stored state information of the network to which the terminal is connected;
   determining, by the network device, whether or not the terminal is allowed to access the wireless local area network based on the information regarding the ratio at which the access point is allowed to be used, the load information of the access point, and/or the interference information of the access point; and
   sending, by the network device, in response to determining that the data offloading is to be performed and that the terminal is allowed to access the wireless local area network, offloading instruction information to the terminal, wherein the offloading instruction information comprises identification information of the wireless local area network.

2. The method according to claim 1, wherein the control point is configured to control the access point of the wireless local area network.

3. The method according to claim 1, wherein the access point state information is received periodically from the control point.

4. The method according to claim 1, wherein before receiving the access point state information, the method further comprises:
   acquiring, according to position information of the terminal, access point identification information corresponding to the position information;
   sending the access point identification information to the control point periodically.

5. A base station, comprising:
   a receiver, configured to receive access point state information of a wireless local area network from a control point based on the control point determining that ratios at which all access points corresponding to the control point are allowed to be used are greater than a preset value, wherein the access point state information comprises information regarding a ratio at which an access point is allowed to be used, load information of the access point, and/or interference information of the access point;
   a transmitter, configured to send offloading instruction information to a terminal connected to a network if it is determined, according to stored state information of the network to which the terminal is connected, that data offloading needs to be performed for the terminal and it is determined, according to the information regarding the ratio at which the access point is allowed to be used, the load information of the access point, and/or the interference information of the access point, that the terminal is allowed to access the wireless local area network, wherein the offloading instruction information comprises identification information of the wireless local area network.

6. The base station according to claim 5, wherein the control point configured to control the access point of the wireless local area network.

7. The base station according to claim 6, wherein the control point is a wireless local area network control point (WLAN AC).

8. The base station according to claim 5, wherein the receiver is configured to receive the access point state information periodically from the control point.

9. The base station according to claim 5, wherein the base station further comprises:
   a processor, configured to acquire, according to position information of the terminal, access point identification information corresponding to the position information;
   wherein the transmitter is further configured to periodically send the access point identification information to the control point configured to control the access point of the wireless local area network, wherein the access point identification information is configured to instruct the control point to send access point state information corresponding to the access point identification information to the base station.

10. The base station according to claim 5, wherein the access point is a wireless local area network access point (WLAN AP).

\* \* \* \* \*